Feb. 4, 1969 G. G. CLAYTON 3,425,490
CLEANING ASSEMBLY
Original Filed Oct. 22, 1965
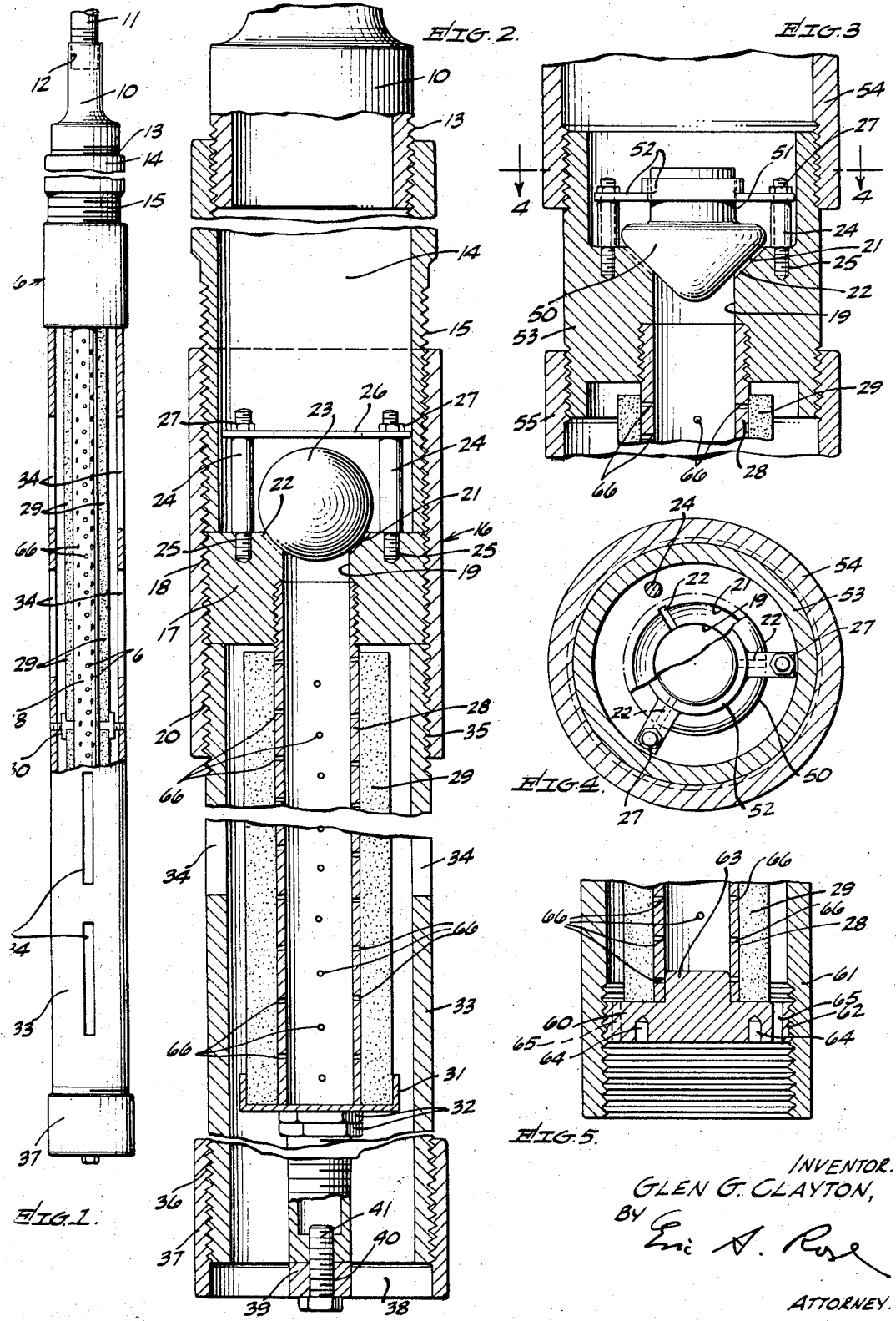
INVENTOR.
GLEN G. CLAYTON,
BY
ATTORNEY.

United States Patent Office 3,425,490
Patented Feb. 4, 1969

3,425,490
CLEANING ASSEMBLY
Glen G. Clayton, 330 W. 223rd St.,
Torrance, Calif. 90502
Substituted for abandoned application Ser. No. 501,426,
Oct. 22, 1965. This application Apr. 26, 1968, Ser. No.
732,478
U.S. Cl. 166—205                                 1 Claim
Int. Cl. E03b *3/18;* B21b *43/08*

ABSTRACT OF THE DISCLOSURE

A well cleaning assembly having a perforated filter support pipe and a tubular filter disposed in fixed position about the support pipe and valve means removably affixed to the upper end of the support pipe so that fluid containing granular material or impurities will be pumped through the filter and filter support pipe upwardly and pass through the valve to suitable sub-surface pump means and causing the granular material or impurities to be deposited in the bottom of the well.

Reference is made to my application for Letters Patent for Well Cleaning Assembly, heretofore filed on Oct. 22, 1965, Ser. No. 501,426, now abandoned.

My invention relates to the improvement in well cleaning assembly, and particularly to an assembly designed to separate sand and other granular particles from liquids such as oil or water; and the objects of my invention are, first, to provide a well cleaning assembly adapted to separate sand from oil in an oil well where such sand separator is required for efficient operation; second, to provide a well cleaning assembly preventing sand and other granular particles from entering the pumping barrel or tubing; third, to provide a well cleaning assembly which by reason of its sturdy construction and design will accomplish, inexpensively and efficiently the separation of sand and other granular particles from oil or water in operations where such separation is required or desired.

Additional objects, together with further advantages derived in utilizing the present invention, will become apparent from the detailed description thereof, taken together with the accompanying drawing forming part of the specification, in which—

FIGURE 1 is an elevational view of my invention partially broken away and in section;

FIGURE 2 is an enlarged fragmentary cross-sectional view of the well cleaning assembly;

FIGURE 3 is an enlarged fragmentary cross-sectional view of a modified form of the valve mechanism of my well cleaning assembly;

FIGURE 4 is a cross-sectional plane view of the modified form of the valve mechanism of my well cleaning assembly taken on line 4—4 of FIGURE 3; and FIGURE 5 is a modified form of a filter base support of my well cleaning assembly.

Similar numerals refer to similar parts throughout the several views.

My invention described in the accompanying drawing, and particularly in FIGURES 1 and 2 of the drawing, includes an adapter coupling 10 having a reduced internally threaded upper end 12 threadedly connected to a pipe 11, which is connected to a subsurface pump assembly.

The lower end of the adapter coupling 10 is externally threaded 13 into an elongated tubular segment 14 of predetermined length serving as a fluid collecting chamber for the pump not shown in the drawnig.

The lower end of the tubular segment 14 is threaded externally 15 connecting to an internally threaded valve housing 16 for a predetermined distance.

A cylindrical valve base 17 is threaded externally 18 and disposed within the valve housing 16 in contact with the lower end of the tubular segment 14.

A center bore 19 is provided in the valve base 17, and the lower portion of the bore is internally threaded. The upper portion of the bore has a valve seat 21 having three grooves 22 spaced 120° apart in said valve seat 21.

A ball 23 is movably disposed within the valve seat 21.

Three studs 24 are threadely affixed to the valve base 17 in threaded openings 25 provided in said valve base and are spaced 120° apart.

A limit ring 26 is disposed upon the upper portion of the studs 24 and secured above the ball 23 by suitable nuts 27 affixed to the upper portion of the studs 24.

A perforated filter support pipe 28 having external threads at both ends is threadedly engaged at its upper end and in the opening 19 provided in the valve base 17.

A tubular filter 29 of suitable mineral permeable material is disposed about the filter support pipe. The filter consists of two longitudinal sections separated and fixed in position by a plurality of filter connection flanges 30. The lower tubular section of the filter 29 is fixed in position about the filter support pipe 28 between the plurality of filter connection flanges 30 and a filter base 31 comprised of a cap having a central bore and extending about the filter 29 at its lower end.

An outer tube 33, being externally threaded at each end, is disposed about the filter 29 in spaced relation thereto, and the upper threaded portion 35 is threadedly engaged to the internally threaded lower portion 20 of the valve housing 16. A plurality of enlongated slots 34 are disposed in vertical alignment about the outer tube 35.

The lower externally threaded end 36 of the outer tube is threadedly engaged to a sleeve 37 having welded cross segments 38, 39 at the free end thereof, and having an internally threaded bore 40. A bolt 41 extends through the bore 40 into the internally threaded plugged end of the perforated filter support pipe 28. A pair of nuts 32, the upper nut acting as a jam nut, and the lower nut acting as a lock nut, are threaded about the lower end of the perforated filter support pipe 28 against the filter base 31.

As shown in FIGURE 3 of the drawing, the valve mechanism may be attached in modified form to an elongated tubular segment 54 having a lower internally threaded portion. In this modification, the valve base 53 comprises a cylindrical section having externally threaded ends, the upper end of which is threadedly engaged to the lower end of the elongated tubular segment, and the lower end of which is engaged to the internally threaded end 55 of the outer tube 33. The internal structure of the valve housing 53 is identical to the valve housing shown in FIGURE 2 of the drawing, however, a valve plug 50 is seated on the valve seat 21 having fluid bypass grooves 22 and comprises an inverted cone-shaped portion to which a cylindrical shoulder 51 is attached. The cylindrical shoulder 51 is slidably arranged in valve guide spider 52 disposed about the studs 24, as described in the arrangement shown in FIGURE 2.

As shown in FIGURE 5, the filter may be secured in position by a plug 60 having external threads and being threadedly engaged in the internally threaded end 62 of the outer tube 61. A boss 63 is integrally connected to the center of the plug 62 and extends a predetermined distance into the lower end of the perforated filter support pipe 28.

A plurality of vertical openings 65 are provided in the plug 60 in alignment with the inner space between the outside of the filter 29 and the inside of the outer tube 61.

Suitable depressions 64 are provided in the bottom of the plug 60 for the manipulation of the plug by a spanner type wrench or similar tool.

A plurality of perforations 66 are indicated in the perforated filter support pipe 28, for purpose of illustration only, since the location of the perforations within the pipe is not material.

In operation, fluid containing sand or other granular material or impurities will enter the tool through the elongated slots 34 in the outer tube 33, and the fluid will be pumped through the permeable filter element 29 and through the perforated filter support pipe 28 upwardly permitting through the initiated action of fluid passing through the fluid bypass grooves 22 to lift the ball valve 23, permitting the fluid to enter the elongated tubular segment 14, from where it is lifted upwardly through the sub-surface pump, not shown in the drawing. The sand, granular materials or other impurities are deposited in the bottom of the well through the space between the inside of the outer tube 33 and the outside of the filter 29.

It is understood that various forms of my invention may be used or utilized, embodying the principles of my invention, without departing from the spirit of my invention.

I claim:

1. A well cleaning assembly of the class described including a tubular valve housing threaded internally, an elongated tubular segment having an externally threaded lower end threadedly engaged to the upper portion of said valve housing, a cylindrically shaped valve base threaded externally and disposed threadedly within the valve housing in contact with the lower end of the tubular segment and having a center bore having a threaded lower portion and having a valve seat about its upper end and a plurality of radial grooves disposed a predetermined distance apart within said valve seat, valve means disposed removably on said valve seat, a perforated filter support pipe having an externally threaded upper end being threadedly engaged to said valve base within the internally threaded lower portion thereof, a tubular filter disposed about the perforated filter support pipe consisting of mineral permeable material in tubular form, an outer tube having a plurality of elongated vertically aligned slots and having an upper externally threaded end threadedly engaged to the internally threaded lower end of the valve housing and forming an interspace of preselected width between the inside of said outer tube and the outside of said tubular filter, and means disposed between said outer tube and the lower end of said filter and filter support pipe adapted to fix the filter in stationary position.

References Cited

UNITED STATES PATENTS

| | | | |
|---|---|---|---|
| Re. 14,756 | 11/1919 | Scott | 166—157 X |
| 131,500 | 9/1872 | Chapman et al. | 166—205 X |
| 139,018 | 5/1873 | Morrison | 166—205 X |
| 166,048 | 7/1875 | Whipple | 166—205 X |
| 541,846 | 7/1895 | Gilpin | 166—205 X |
| 1,899,065 | 2/1933 | Tilbury | 166—205 |
| 2,257,344 | 9/1941 | Maloney | 166—228 |
| 2,335,558 | 11/1943 | Young | 166—157 X |
| 3,314,481 | 4/1967 | Willman et al. | 166—205 |

DAVID H. BROWN, *Primary Examiner.*

U.S. Cl. X.R.

166—236, 228